Figure 1:
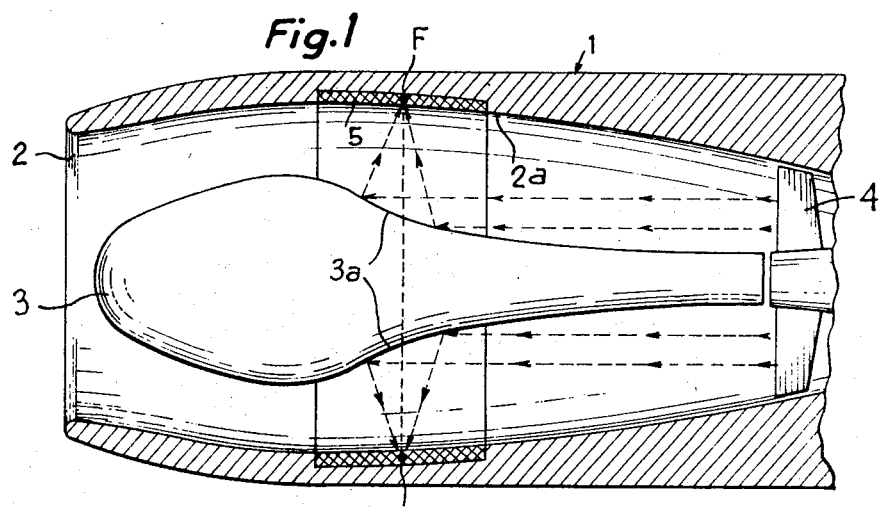

United States Patent
Labussiere et al.

[15] 3,692,141
[45] Sept. 19, 1972

[54] METHOD OF AND MEANS FOR NOISE ATTENUATION

[72] Inventors: Andre Julien Labussiere, Fontenay-Le-Fleury; Joseph Henri Leon, Thiais, both of France

[73] Assignee: Avions Marcel dassault, Rue du Professeur pouchet, Vaucresson, France

[22] Filed: Oct. 28, 1971

[21] Appl. No.: 193,597

Related U.S. Application Data

[63] Continuation of Ser. No. 844,794, July 25, 1969, abandoned.

[30] Foreign Application Priority Data

July 26, 1968 France...................68160895

[52] U.S. Cl..............181/33 E, 181/33 H, 181/47 B, 181/35 A, 137/15.1, 415/119
[51] Int. Cl..........B64d 33/06, F01n 1/24, F01n 7/00
[58] Field of Search.......181/33 R, 35 R, 35 A, 33 H, 181/33 HA, 33 HB, 33 HC, 33 HD, 33 HE, 47 B, 33 E, 47 R, 33 L, 33 GB, 42, 50; 137/15.1, 15.2; 415/119

[56] References Cited

UNITED STATES PATENTS

| | | | |
|---|---|---|---|
| 1,909,511 | 5/1933 | Wilson | 181/47 B |
| 2,501,306 | 3/1950 | Bessiére | 181/47 B |

FOREIGN PATENTS OR APPLICATIONS

| | | | |
|---|---|---|---|
| 56,514 | 7/1952 | France | 181/47 B |
| 1,217,917 | 12/1959 | France | 181/47 B |
| 610,841 | 10/1948 | Great Britain | 181/42 |

Primary Examiner—Robert S. Ward, Jr.
Attorney—William J. Daniel

[57] ABSTRACT

The noise originating from acoustic energy transmitted through a duct is suppressed by focusing it, by means of properly designed acoustic reflectors, so that it is concentrated on localized restricted zones of the duct wall, the provision of adequate sound absorptive linings being limited to these restricted zones. This noise suppressing system is applicable to air intakes of turbojets, turbofan casings, silencers for the jet of jet propulsion units.

8 Claims, 3 Drawing Figures

PATENTED SEP 19 1972 3,692,141

METHOD OF AND MEANS FOR NOISE ATTENUATION

This application is a continuation of application Ser. No. 844,794, filed July 25, 1969, now abandoned.

The noise produced by turbojet engines can be divided into two basic categories:

1. The noise which is produced by rotation of the rotating parts and which is emitted through the intake and the nozzle; the spectrum of this noise component is constituted by discrete frequencies appearing throughout a continuous spectrum noise component.
2. The noise which is produced in the region where the jet of gas coming from the engine mixes with the environmental air; the noise sources are here distributed within the jet itself downstream of the nozzle.

The present invention proposes novel ducting arrangements designed to achieve considerably attenuation of the noise components of both these categories, whilst maintaining good aerodynamic efficiencies.

As far as the noise components produced by the rotating parts of the engine are concerned, the invention relates not merely to turbojet engines but equally to any other machine having fluid intake and exit arrangements which could transmit noise components to the exterior, for example pumps, fans, turbo-generators and so on.

The invention relates, furthermore, to the attenuation of the noise components which are produced by jets and other gas flows when received in some kind of enclosure or expansion chamber, such as the silencers used for jet engines operated on airports or on test beds, for wind-tunnels and the like.

In accordance with the invention, the acoustic energy transmitted through a duct is focused by an appropriate arrangement of acoustic reflectors in such manner as to concentrate said energy on localised zones of the internal surface of the duct and, in these localised zones, acoustic absorptive linings are provided, such as porous linings, cavities, resonators or any other arrangements having good absorption properties.

The chief advantages of the noise-attenuating method of the invention are as follows:

Since the acoustic energy is concentrated in restricted zones, only a small section of the internal wall so the ducting need be acoustically processed;

The localisation of the acoustic processing secures a double gain, compared with what is obtainable by conventional means:

a. from the aerodynamic point of view, the duct losses are reduced;

b. from the acoustic point of view, the method minimises the effect of increased noise at the source, i.e., at the rotating parts, which is due to the increased turbulence produced by the conventional sound-damping linings which are distributed over the whole internal surface of the fairings.

Figure 2:
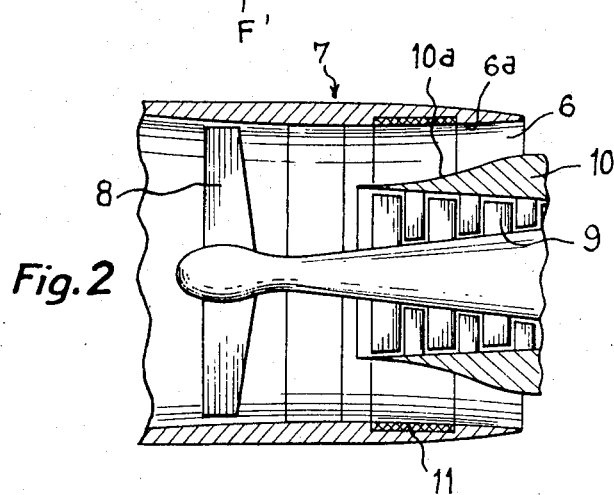
Figure 3:
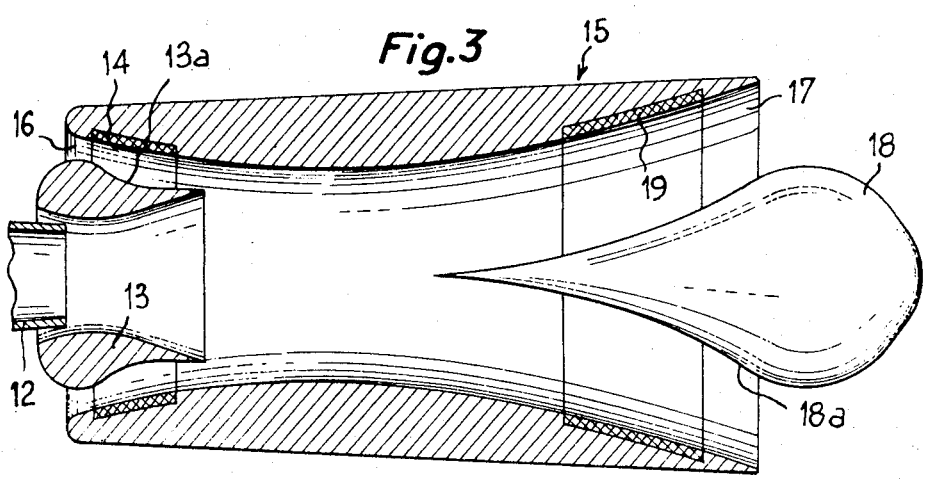

Several embodiments of the invention will now be described, by way of example, with reference to the accompanying drawings, in which:

FIG. 1 is a highly diagrammatic section through a compressor air intake, illustrating how the invention may be applied, and FIGS. 2 and 3 are similar views showing the invention applied respectively to the air discharge of a ducted fan or turbofan, and to a jet engine nozzle.

FIG. 1 diagrammatically illustrates an air intake casing 1, designed in accordance with the invention. In this embodiment the air inlet 2 is a body of revolution and the geometrical cross-section available for the throughflow of air is constant. This casing contains a central body 3 suitably designed so that the acoustic waves leaving the compressor 4 and travelling forwards are reflected at the parabolic surface 3a and focussed on the duct wall 2a. Accordingly, as far as sound components travelling parallel to the axis of revolution are concerned, focussing will be upon a circle F-F', and for sound travelling along other lines there will be successive reflection between the core element 3 and the annular wall 2a.

The acoustic energy coming from the compressor 4 is thus essentially reflected at the parabolic reflector 3a and concentrated in the restricted zone of the wall 2a, and therefore the application of absorptive systems, illustrated in FIG. 1 in the form of a cross-hatched sleeve 5, can be restricted to this zone.

Although the embodiment illustrated in FIG. 1 relates to a subsonic intake design using a central fixed body, it is possible without difficulty to apply the same principles to a supersonic variable area intake, for example an Oswatitach diffuser. It will be understood that, in such circumstances, the silencing system will be based preferably upon the "retracted" position of the central body, this corresponding to the take-off and landing conditions of flight where the noise attenuation problems are the most severe, rather than in supersonic flight at high altitude with the central body "out," this being the flight condition where efficiency is the prime consideration.

FIG. 2 illustrates the application of the invention to the exit fairing 6 of a turbofan engine 7, the fan or low-pressure compressor of which is indicated at 8 and the high-pressure compressor at 9.

In this case, in accordance with the invention, the casing 10 of the compressor 9 has an external surface 10a which is formed as a parabolic reflector for the acoustic waves produced by the fan 8 and focusses them on a restricted zone of the internal surface 6a of the exit fairing 6, which zone is lined with an absorptive system 11.

The further embodiment illustrated in FIG. 3 is a fixed or mobile silencer which can be used on the ground for jet aircraft or on jet engine test beds.

Reference numeral 12 indicates the terminal portion of a jet engine nozzle the jet from which is picked up in a sleeve 13 having an external surface 13a designed as a parabolic reflector and co-operating with an absorptive system 14 locally arranged over a zone opposite the wall of a dilution air venture 15 through which environmental air is drawn at 16. The mixture of air and hot gases is discharged to the ambient atmosphere through an annular exit section 17 defined internally by a central profiled body 18.

As before, the profiled body 18 has an external surface 18a serving as a parabolic reflector and concentrating the acoustic energy upon an absorptive lining 19 formed on the wall of the exit duct 17.

It will be observed that the exit section 17 is very large in relation to the section 12 of the jet. These sections can be in a ratio of the order of 10 to 1 or more so that a substantial reduction is obtained in the output noise level. The output can be directed upwards by elbowing the whole of the enclosure 15 through 90°.

It will be understood that the examples described are susceptible of modification, in particular by the substitution of technical equivalents. Thus, for example, the form of a paraboloid of revolution, described hereinbefore in respect of the reflector, can be replaced by other appropriate forms, for instance that of an ellipsoid one of the foci of which would be located in the zone in which the noise was generated, and the other on the noise-absorbing lining.

We claim:

1. Method for suppressing noise caused by acoustic energy propagated from a source, comprising the steps of tunneling said acoustic energy over a major length between two spaced substantially coaxial cross-sectional areas respectively adjacent to and remote from said source, reflecting said acoustic energy to focus it on a confined minor fraction of said major length intermediate said cross-sections, and providing acoustic energy absorbent material exclusively on said minor fraction.

2. A method of suppressing noise caused by acoustical energy accompanying a high speed flow of gaseous fluid which comprises passing said flow of fluid through an annular flow path between generally coaxial inlet and outlet openings spaced apart a substantial distance; without substantially interfering with the smooth flow of said fluid through said flow path, reflecting said acoustic energy to focus it on a limited fraction of said flow path; and providing acoustical energy absorbent material exclusively on the limited fraction of said flow path while leaving the remainder thereof free of said absorbent material.

3. The method of claim 2 wherein said annular flow path is contained between two radially spaced apart elongated surfaces of revolution, one of which includes a portion of gradually increasing radius, and said acoustical energy absorbing material is provided on a portion of the other of said surfaces generally opposite the portion of increasing radius of said first surface.

4. System for suppressing noise caused by acoustic energy propagated from a source, comprising a duct bounded by a wall extending over a major length between two spaced substantially coaxial openings respectively adjacent to and remote from said source and defining between said openings a flow path of generally rectilinear axis, acoustic energy absorbing means confined to a minor length of said wall intermediate said openings, and an acoustic energy focusing reflector positioned opposite said minor wall length and designed for concentrating acoustic energy on said confined absorbing means.

5. Noise suppressing system as claimed in claim 4 wherein said duct is bounded by radially-spaced inner and outer walls defining therebetween an annular flow path of generally rectilinear axis, and wherein said acoustic energy focusing reflector is positioned on said inner wall and said acoustic energy absorbing means is confined on said outer wall.

6. Noise suppressing system as claimed in claim 5 wherein said duct is in the general shape of a solid of revolution about said rectilinear axis.

7. Noise suppressing system as in claim 4 wherein said energy focusing reflector is defined by a portion of said inner wall of gradually increasing radius.

8. The system of claim 7 wherein the maximum radius of said reflector portion of said inner wall is substantially equal to the minimum radius of said outer wall at a remote point thereon.

* * * * *

UNITED STATES PATENT OFFICE
CERTIFICATE OF CORRECTION

Patent No. 3,692,141      Dated September 19, 1972

Inventor(s) Andre Julien LABUSSIERE et al

It is certified that error appears in the above-identified patent and that said Letters Patent are hereby corrected as shown below:

In the heading of the Patent:

Assignee: change "dassault" to -- Dassault --;
            change "pouchet" to -- Pauchet --.

Signed and sealed this 20th day of February 1973.

(SEAL)
Attest:

EDWARD M. FLETCHER, JR.          ROBERT GOTTSCHALK
Attesting Officer                 Commissioner of Patents

FORM PO-1050 (10-69)